(12) United States Patent
Uchikawa et al.

(10) Patent No.: US 7,031,065 B2
(45) Date of Patent: Apr. 18, 2006

(54) SPATIAL LIGHT MODULATOR AND PROJECTOR

(75) Inventors: Daisuke Uchikawa, Chino (JP); Masatoshi Yonekubo, Hara-mura (JP); Shunji Kamijima, Hara-mura (JP); Kazuhisa Mizusako, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/044,178

(22) Filed: Jan. 28, 2005

(65) Prior Publication Data
US 2005/0168822 A1   Aug. 4, 2005

(30) Foreign Application Priority Data
Feb. 3, 2004 (JP) ............................. 2004-026717

(51) Int. Cl.
*G02B 27/10* (2006.01)

(52) U.S. Cl. ....................... 359/626; 359/619

(58) Field of Classification Search ................ 359/619, 359/620, 626, 628, 455, 237; 349/5, 95; 353/31, 33, 34, 81, 82
See application file for complete search history.

(56) References Cited

U.S. PATENT DOCUMENTS
6,583,938 B1 *   6/2003   Woodgate et al. .......... 359/625

FOREIGN PATENT DOCUMENTS
JP       A 2003-215592       7/2003

* cited by examiner

*Primary Examiner*—Ricky Mack
*Assistant Examiner*—Jack Dinh
(74) *Attorney, Agent, or Firm*—Oliff & Berridge, PLC

(57) ABSTRACT

Exemplary embodiments of the invention provide a spatial light modulator that is inexpensive, has a long life and a high light use efficiency, and with which can be obtained a high-contrast image, and a projector disposed with the spatial light modulator. Exemplary embodiments provide a spatial light modulator including a liquid crystal layer that includes plural aperture regions AP, modulates light in accordance with image signals and emits the modulated light; and microlens elements that are disposed at an incident side of the liquid crystal layer in correspondence to the aperture regions AP and condense the light made incident so that the light passes through the aperture regions AP. The microlens elements include plural focal positions f1 and f2 that are different per plural substantially annular portions R1 and R2 around an optical axis AX.

5 Claims, 10 Drawing Sheets

F I G. 7
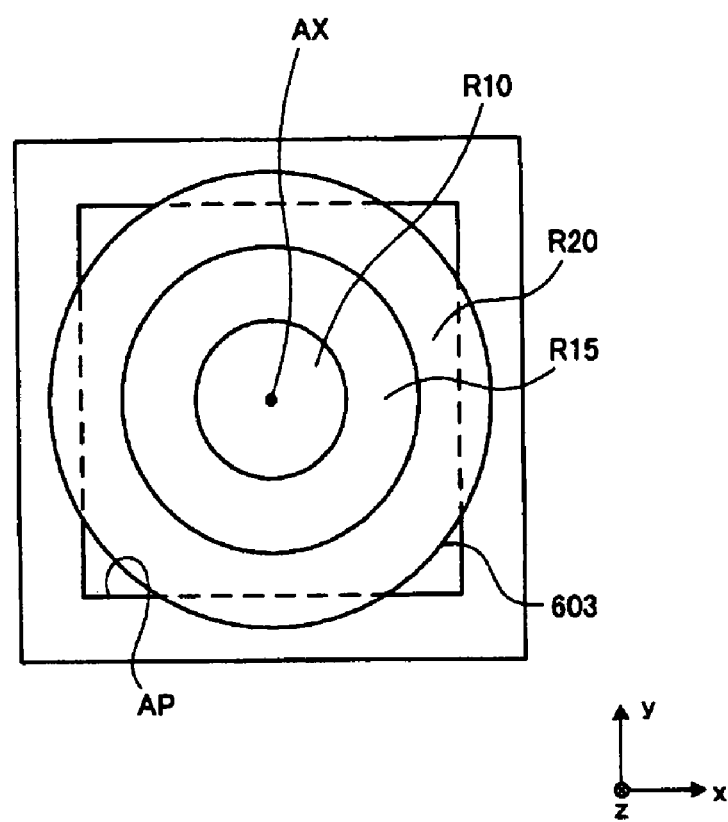

SPATIAL LIGHT MODULATOR AND PROJECTOR

BACKGROUND

Exemplary embodiments of the present invention relate to a spatial light modulator, particularly a liquid crystal type spatial light modulator, and to a projector disposed with the spatial light modulator.

The related art has expanded the home use of projectors. For this reason, it would be advantageous for spatial light modulators in projectors to be inexpensive, to have a long life and high light use efficiency, and to be able to obtain a high-contrast image. A liquid crystal panel is a representative example of such a spatial light modulator. The liquid crystal panel includes an image display region in which are built various kinds of wirings, such as data lines, scanning lines and capacity lines, and various kinds of electronic elements, such as thin film transistors and thin film diodes. For this reason, with respect to each pixel, the region through or by which light contributing to image display can be transmitted or reflected is restricted by the presence of the various kinds of wirings and electronic elements. The aperture ratio of each pixel is defined by the region through or by which light contributing to image display can be transmitted or reflected with respect to the region of each pixel, i.e., by the area ratio of the aperture region. Usually, the aperture ratio of a liquid crystal panel is about 70%. Also, the light from the light source made incident at the liquid crystal panel is transmitted through or reflected by an electro-optical substance layer, such as a liquid crystal layer, in a state where the light is substantially parallel light. For this reason, when the liquid crystal panel is irradiated with the substantially parallel light, of the total light amount, only the light amount corresponding to the aperture ratio of each pixel, can be used. The unused light becomes a light amount loss.

Thus, in the related art, a microlens array including microlens elements corresponding to each pixel, is formed on an opposition substrate of the liquid crystal panel. The microlens elements condense the illumination light from the light source towards the aperture regions in pixel units. The illumination light condensed by the microlens elements can be efficiently transmitted through the aperture regions of the pixels. For this reason, when a microlens array is used in a liquid crystal panel, the use efficiency of the light can be enhanced.

Thus, when the illumination light is condensed, light energy is locally concentrated with respect to an orientation film in the vicinity of the liquid crystal layer. The orientation film locally deteriorates due to the concentration of the light energy. When the orientation film deteriorates, the life of the spatial light modulator is reduced, whereby the need to extend the life cannot be satisfied. For this reason, a configuration to reduce the deterioration of the orientation film when a microlens array is used has been proposed in, for example, JP-A-2003-215592.

In the configuration proposed in JP-A-2003-215592, a light stabilizing agent is added to the orientation film to change resistance characteristics. The light stabilizing agent includes the function of enhancing the light-resistance of the orientation film.

SUMMARY

However, when the light-resistance characteristics of the orientation film are changed, the manufacturing cost of the spatial light modulator rises due to the cost of the additive agent and the increase of the additive step, which is a problem. Also, when a related art microlens array is used, the illumination light is simply condensed, whereby the components made perpendicularly incident with respect to the substrate of the liquid crystal panel are reduced. For this reason, it is a problem because the contrast of the image drops.

Exemplary embodiments of the present invention have been made in light of the above. It is an object of exemplary embodiments to provide a spatial light modulator that is inexpensive, has a long life and high light use efficiency, and with which can be obtained a high-contrast image, and a projector disposed with the spatial light modulator.

In order to address or solve the above discussed and/or other problems according to a first exemplary embodiment, there can be provided a spatial light modulator including: a modulation portion that includes plural pixel aperture portions, modulates light in accordance with image signals and emits the modulated light; and lens portions that are disposed at an incident side of the modulation portion in correspondence to the pixel aperture portions and condense the light made incident so that the light passes through the pixel aperture regions. The lens portions include plural focal positions that are different per plural substantially annular portions around an optical axis. The focal position of one annular portion of the plural annular portions is at a position closer to the lens portions than the focal position of the annular portion closer to the optical axis using the one annular portion as a reference, and both of the plural focal positions are positioned closer to an emission side than the modulation portion.

First, the lens portions are disposed at the incident side of the modulation portion in correspondence to the pixel aperture portions. Additionally, the lens portions condense the light made incident to cause the light to pass through the pixel aperture portions. Thus, the illumination light from the light source can be efficiently passed through the pixel aperture portions, and the amount of light deflected by the pixel aperture portions can be reduced. As a result, the light can be used with high efficiency. Also, the lens portions include plural focal positions that are different per plural substantially annular portions around an optical axis. Additionally, the focal position of one annular portion of the plural annular portions is at a position closer to the lens portions than the focal position of the annular portion closer to the optical axis using the one annular portion as a reference. Moreover, both of the plural focal positions are positioned closer to an emission side than the modulation portion. Due to this configuration, the lens portions condense the light made incident to positions that are different per plural substantially annular portions.

A related art microlens element causes all illumination light to be condensed to one focal position with respect to one pixel aperture portion. In contrast, exemplary embodiments of the present invention cause the illumination light to be condensed to plural focal positions per annual portion. Thus, the distribution density of the light rays can be made substantially uniform in the vicinity of the modulation portion. As a result, because local concentrations of light energy in the vicinity of the modulation portion can be reduced, deterioration of the orientation films can be reduced. Thus, a long-life spatial light modulator can be obtained. Also, it becomes unnecessary to add, as in related art technology, an additive agent to the orientation films in order to enhance light resistance. For this reason, a spatial light modulator whose manufacturing cost is inexpensive can be obtained. Moreover, both of the plural focal positions are positioned closer to the emission side than the modulation portion. Thus, the components made substantially perpendicularly incident with respect to the modulation portion, i.e., the components parallel to the optical axis, become greater. As a result, a high-contrast image can be obtained.

Also, according to a preferable exemplary embodiment of the first invention, the lens portions are preferably aspherical lenses including plural vertex curvature radii. Thus, the distribution density of the light rays can be made more uniform in the vicinity of the modulation portion.

Also, according to a preferable exemplary embodiment of the first invention, a ratio where a focal depth of the substantially annular portion closest to the optical axis is divided by a focal depth of the substantially annular portion furthest away from the optical axis, is preferably greater than 1.1. Thus, the distribution density of the light rays can be made more uniform in the vicinity of the modulation portion. Also, the components made substantially perpendicularly incident with respect to the modulation portion, i.e., the components parallel to the optical axis, become greater. As a result, a high-contrast image can be obtained. It is preferable for the ratio where the focal depth of the substantially annular portion closest to the optical axis is divided by the focal depth of the substantially annular portion furthest away from the optical axis to be greater than 1.2. It is even more preferable for the ratio where the focal depth of the substantially annular portion closest to the optical axis is divided by the focal depth of the substantially annular portion furthest away from the optical axis to be greater than 1.3. Thus, the distribution density of the light rays can be made more substantially uniform in the vicinity of the modulation portion. Additionally, an even higher contrast image can be obtained.

Also, according to a preferable exemplary embodiment of the first invention, the standard deviation of the light amount, in regions of the pixel aperture portions, of the light passing through the pixel aperture portions due to the lens portions, is preferably less than 0.1. The standard deviation of the light amount is the positive square root of dispersion. By dispersion is meant the rate of scattering of plural light amount data in the pixel aperture portions. Specifically, the dispersion is a value where the difference (deviation) between the average value of the light amount data and each light amount data is squared and this difference is arithmetically averaged. The smaller that the numeral value of the dispersion is, the more the light amount data gather around the average value. For this reason, the smaller that the value of the standard deviation, which is the square root of dispersion, is, the more the light amount data gather around the average value and the more the light amount distribution approaches a uniform state. In the present exemplary embodiment, the standard deviation of the light amount is smaller than 0.1. Thus, the light amount can be made substantially uniform in the pixel aperture portions. More preferable, the standard deviation of the light amount is less than 0.085. Thus, the light amount can be made more uniform in the pixel aperture portions.

Also, according to a second exemplary embodiment, there can be provided a projector including: a light source that supplies light; the aforementioned spatial light modulator; and a projection lens that projects the light from the spatial light modulator. Thus, a projector that is inexpensive, has a long life and high light use efficiency, and with which can be obtained a high-contrast image, can be obtained.

BRIEF DESCRIPTION OF THE DRAWINGS

FIG. 7 is a schematic showing the front configuration of the liquid crystal panel of the second exemplary embodiment;

FIG. 8-1 is a schematic showing the configuration of a grayscale mask;

FIG. 8-2 is a schematic showing the manufacturing procedure of a microlens element;

FIG. 8-3 is another schematic showing the manufacturing procedure of the microlens element;

FIG. 8-4 is another schematic showing the manufacturing procedure of the microlens element;

FIG. 9-1 is a schematic showing another manufacturing procedure of the microlens element;

FIG. 9-2 is another schematic showing the other manufacturing procedure of the microlens element;

FIG. 9-3 is another schematic showing the other manufacturing procedure of the microlens element;

FIG. 9-4 is another schematic showing the other manufacturing procedure of the microlens element;

FIG. 9-5 is another schematic showing the other manufacturing procedure of the microlens element;

FIG. 10-1 is a schematic showing a manufacturing procedure of another microlens element;

FIG. 10-2 is another schematic showing the manufacturing procedure of the other microlens element;

FIG. 10-3 is another schematic showing the manufacturing procedure of the other microlens element;

FIG. 10-4 is another schematic showing the manufacturing procedure of the other microlens element; and FIG. 10-5 is another schematic showing the manufacturing procedure of the other microlens element.

DETAILED DESCRIPTION OF EMBODIMENTS

Exemplary embodiments of a projector disposed with a spatial light modulator pertaining to exemplary embodiments of the present invention will be described in detail below with reference to the drawings. It should be noted that the present invention should not be construed as being limited by these exemplary embodiments.

First Exemplary Embodiment

Figure 1:
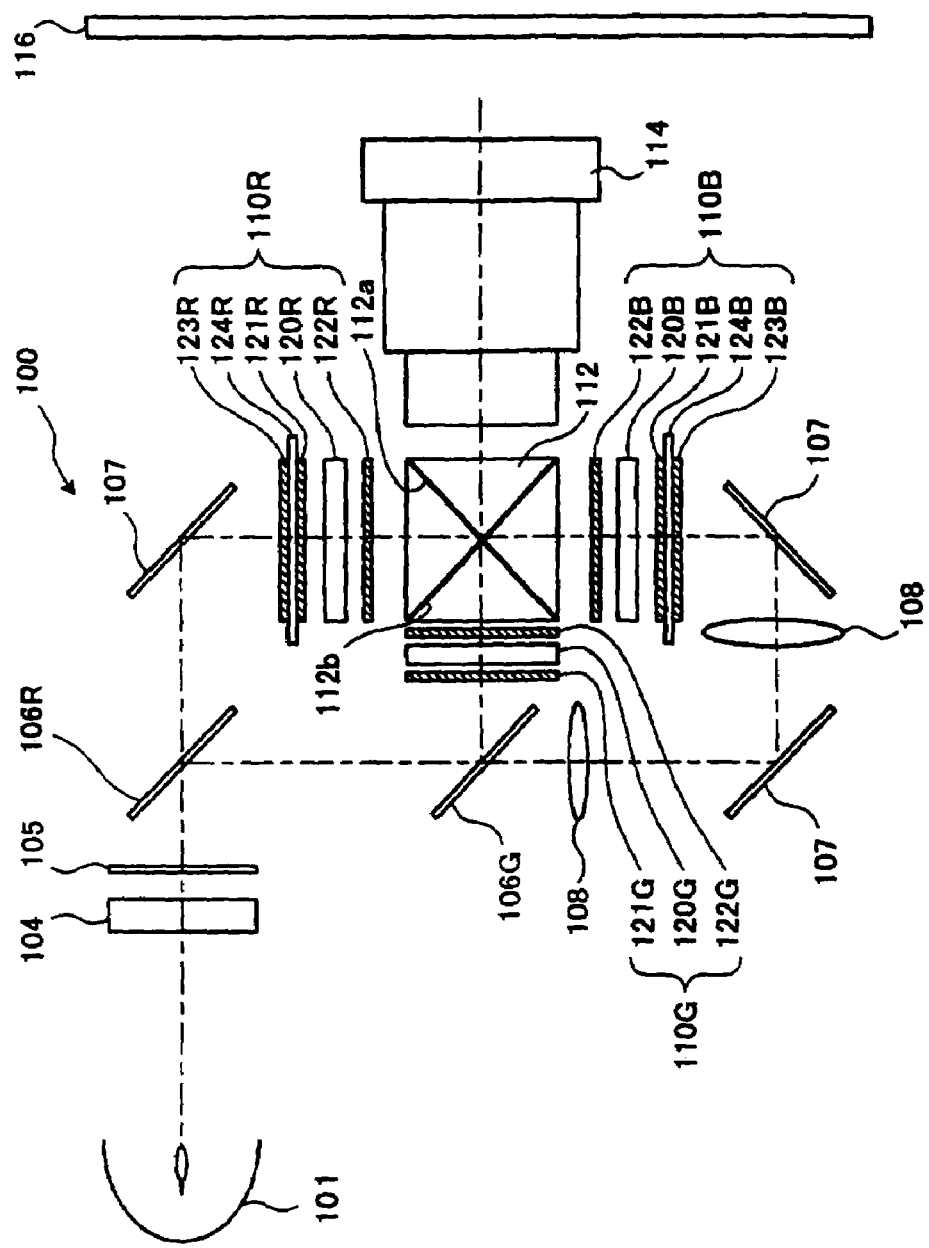
FIG. 1 is a schematic showing a projector pertaining to a first exemplary embodiment.

FIG. 1 is a schematic showing the configuration of a projector 100 pertaining to a first exemplary embodiment of the invention.

(Description of the Overall Projector)

First, with reference to FIG. 1, the schematic configuration of the projector pertaining to the first exemplary embodiment of the invention will be described. Next, with reference to FIG. 2 on, the characteristic configuration of the present exemplary embodiment will be described. In FIG. 1, an ultra-high pressure mercury lamp 101, which is a light source portion, supplies light including red light (called "R light" below), which is a first color light, green light (called "G light" below), which is a second color light, and blue light (called "B light" below), which is a third color light. An integrator 104 makes uniform the illuminance distribution of the light from the ultra-high pressure mercury lamp 101. The light whose illuminance distribution has been made uniform is converted by a polarization conversion element 105 to polarized light including a specific oscillation direction, such as s-polarized light.

The light converted to s-polarized light is made incident at an R light transmitting dichroic mirror 106R configuring a color separating optical system. Description will be given in regard to the R light below. The R light transmitting dichroic mirror 106R transmits R light and reflects G light and B light. The R light transmitted through the R light transmitting dichroic mirror 106R is made incident at a reflective mirror 107. The reflective mirror 107 bends the optical path of the R light approximately 90°. The R light whose optical path has been bent is made incident at a first color light-use spatial light modulator 110R that modulates, in accordance with image signals, the R light that is the first color light. The first color light-use spatial light modulator 110R is a transmissive type liquid crystal display device that modulates the R light in accordance with image signals. Because the polarization direction of light does not change even if the light is transmitted through a dichroic mirror, the R light made incident at the first color light-use spatial light modulator 110R remains s-polarized light.

The first color light-use spatial light modulator 110R includes a λ/2 phase difference plate 123R, a glass plate 124R, a first polarizing plate 121R, a liquid crystal panel 120R and a second polarizing plate 122R. The detailed configuration of the liquid crystal panel 120R will be discussed later. The λ/2 phase difference plate 123R and the first polarizing plate 121R are disposed in a state where they contact the glass plate 124R, which has a transmissivity that does not change the polarization direction. Thus, the first polarizing plate 121R and the λ/2 phase difference plate 123R can circumvent the problem of being deformed by heat. In FIG. 1, the second polarizing plate 122R is disposed independently, but it may also be disposed in a state where it contacts the emission side of the liquid crystal panel 120R and the incident side of a cross dichroic prism 112.

The s-polarized light made incident at the first color light-use spatial light modulator 110R is converted by the λ/2 phase difference plate 123R to p-polarized light. The R light converted to p-polarized light is transmitted as is through the glass plate 124R and the first polarizing plate 121R and made incident at the liquid crystal panel 120R. As for the p-polarized light made incident at the liquid crystal panel 120R, the R light is converted to s-polarized light by modulation in accordance with image signals. The R light converted to s-polarized light by the modulation of the liquid crystal panel 120R is emitted from the second polarizing plate 122R. In this manner, the R light modulated by the first color light-use spatial light modulator 110R is made incident at the cross dichroic prism 112, which is a color synthesizing optical system.

Next, description will be given in regard to the G light. The optical paths of the G light and B light reflected by the R light transmitting dichroic mirror 106R are bent approximately 90°. The G light and B light whose optical paths have been bent are made incident at a B light transmitting dichroic mirror 106G. The B light transmitting dichroic mirror 106G reflects the G light and transmits the B light. The G light reflected by the B light transmitting dichroic mirror 106G is made incident at a second color light-use spatial light modulator 110G that modulates the G light in accordance with image signals. The second color light-use spatial light modulator 110G is a transmissive type liquid crystal display device that modulates the G light in accordance with image signals. The second color light-use spatial light modulator 110G includes a liquid crystal panel 120G, a first polarizing plate 121G and a second polarizing plate 122G. The detailed configuration of the liquid crystal panel 120G will be discussed later.

The G light made incident at the second color light-use spatial light modulator 110G is converted to s-polarized light. The s-polarized light made incident at the second color light-use spatial light modulator 110G is transmitted as is through the first polarizing plate 121G and made incident at the liquid crystal panel 120G. As for the s-polarized light made incident at the liquid crystal panel 120G, the G light is converted to p-polarized light by modulation in accordance with image signals. The G light converted to p-polarized light by the modulation of the liquid crystal panel 120G is emitted from the second polarizing plate 122G. In this manner, the G light modulated by the second color light-use spatial light modulator 110G is made incident at the cross dichroic prism 112, which is the color synthesizing optical system.

Next, description will be given in regard to the B light. The B light transmitted through the B light transmitting dichroic mirror 106G is made incident, via two relay lenses 108 and two reflective mirrors 107, at a third color-light use spatial light modulator 110B that modulates the B light in accordance with image signals. The third color light-use spatial light modulator 110B is a transmissive type liquid crystal display device that modulates the B light in accordance with image signals.

The reason the B light is made to pass through the relay lenses 108 is because the length of the optical path of the B light is longer than the optical paths of the R light and the G light. By using the relay lenses 108, the B light transmitted through the B light transmitting dichroic mirror 106G can be guided as is to the third color light-use spatial light modulator 110B. The third color light-use spatial light modulator 110B includes a λ/2 phase difference plate 123B, a glass plate 124B, a first polarizing plate 121B, a liquid crystal panel 120B and a second polarizing plate 122B. Because the configuration of the third color light-use spatial light modulator 110B is the same as the configuration of the first color light-use spatial light modulator 110R, detailed description thereof will be omitted.

The B light made incident at the third color light-use spatial light modulator 110B is converted to s-polarized light. The s-polarized light made incident at the third color light-use spatial light modulator 110B is converted to p-polarized light by the λ/2 phase difference plate 123B. The B light converted to p-polarized light is transmitted through the glass plate 124B and the first polarizing plate 121B and made incident at the liquid crystal panel 120B. As for the p-polarized light made incident at the liquid crystal panel 120B, the B light is converted to s-polarized light by modulation in accordance with image signals. The B light converted to s-polarized light by the modulation of the liquid crystal panel 120B is emitted from the second polarizing plate 122B. The B light modulated by the third color light-use spatial light modulator 110B is made incident at the cross dichroic prism 112, which is the color synthesizing optical system. In this manner, the R light transmitting dichroic mirror 106R and the B light transmitting dichroic mirror 106G configuring color separating optical systems separate the light supplied from the ultra-high pressure mercury lamp 101 into the R light, which is the first color light, the G light, which is the second color light, and the B light, which is the third color light.

The cross dichroic prism 112, which is the color synthesizing optical system, is configured by two dichroic films 112a and 112b being disposed so as to intersect in an "X" manner. The dichroic film 112a reflects the B light and transmits the R light and the G light. The dichroic film 112b reflects the R light and transmits the B light and the G light. In this manner, the cross dichroic prism 112 synthesizes the R light, G light and B light respectively modulated by the first color light-use spatial light modulator 110R, the second color light-use spatial light modulator 110G and the third color light-use spatial light modulator 110B. A projection lens 114 projects, onto a screen 116, the light synthesized by the cross dichroic prism 112. Thus, a full-color image can be obtained on the screen 116.

As described above, the light made incident at the cross dichroic prism 112 from the first color light-use spatial light modulator 110R and the third color light-use spatial light modulator 110B is set to become s-polarized light. Also, the light made incident at the cross dichroic prism 112 from the second color light-use spatial light modulator 110G is set to become p-polarized light. By making the polarization directions of the light made incident at the cross dichroic prism 112 different in this manner, the light emitted from each color light-use spatial light modulator can be effectively synthesized in the cross dichroic prism 112. The dichroic films 112a and 112b ordinarily have excellent s-polarized light reflectance characteristics. For this reason, the R light and the B light reflected by the dichroic films 112a and 112b are made into s-polarized light, and the G light transmitted through the dichroic films 112a and 112b is made into p-polarized light.

(Configuration of the Liquid Crystal Panels)

Next, the details of the liquid crystal panels will be described using FIG. 2. The projector 100 described in FIG. 1 is disposed with the three liquid crystal panels 120R, 120G and 120B. With respect to these three liquid crystal panels 120R, 120G and 120B, only the wavelength regions of the light that the liquid crystal panels modulate are different, and their basic configurations are the same. For this reason, in the description below, the liquid crystal panel 120R will be used as a representative example.

Figure 2:
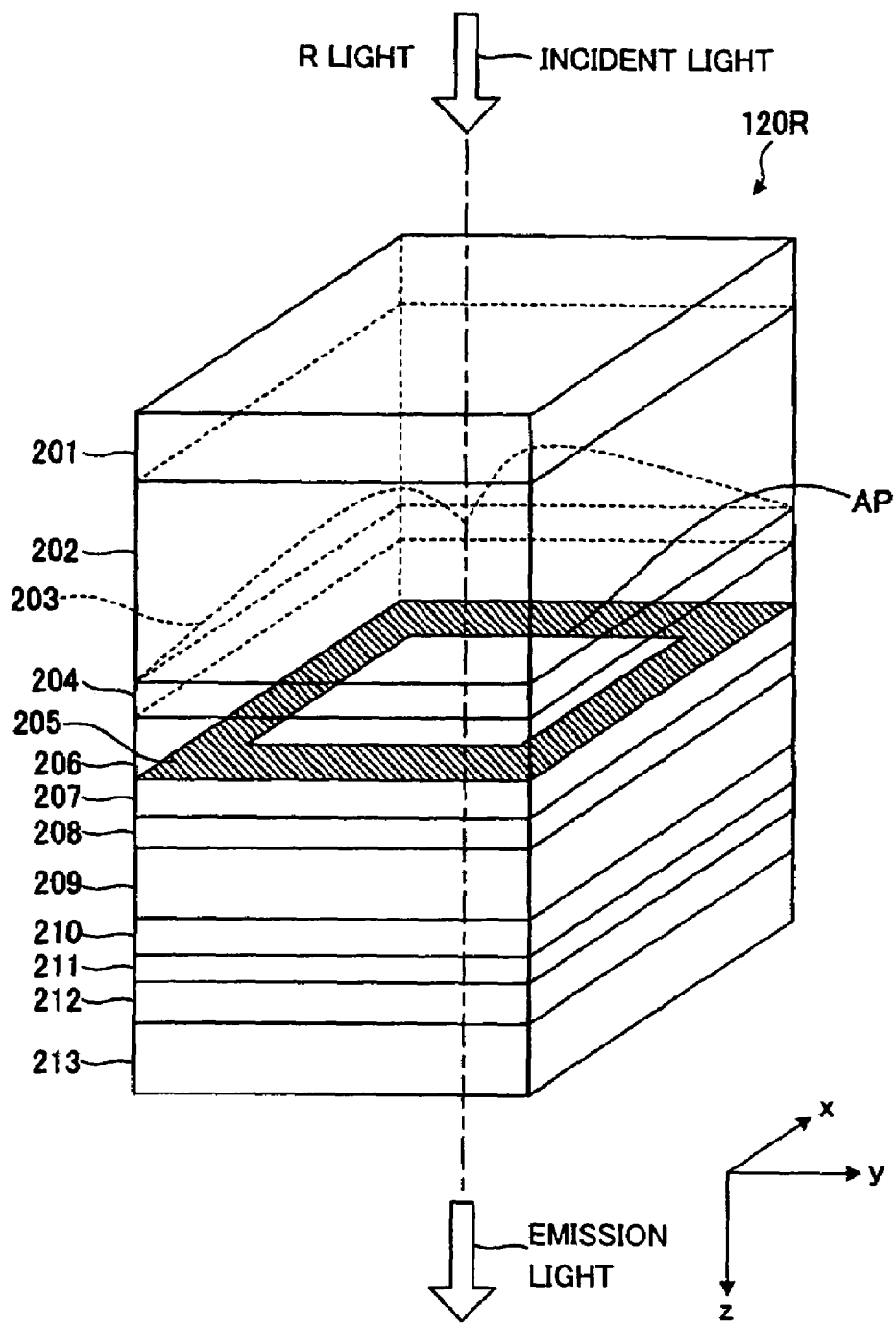
FIG. 2 is a schematic perspective view of a liquid crystal panel of the first exemplary embodiment.

FIG. 2 is a schematic cross-sectional diagram of part of the liquid crystal panel 120R. In the liquid crystal panel 120R, plural aperture regions AP are disposed in substantially orthogonal grids. The aperture regions AP, which are pixel aperture portions, are rectangular aperture portions formed in a black matrix 205 that includes a light-blocking function. The aperture region AP corresponds to one pixel. FIG. 2 shows only one aperture region AP of the plural aperture regions AP of the liquid crystal panel 120R. Because the configuration of the liquid crystal panel 120R corresponding to the other aperture regions is the same as the configuration shown in FIG. 2, overlapping description will be omitted. The light from the ultra-high pressure mercury lamp 101 is made incident at the liquid crystal panel 120R from the upper side of FIG. 2, and is emitted in the direction of the screen 116 from the lower side. A microlens element 203 that is a lens portion is formed at an inner side (emission side) of an incident-side dustproof transparent plate 201 by a microlens array substrate 202 and an optically transparent adhesive layer 204. The detailed configuration and action of the microlens element 203 will be described later using FIG. 3. One microlens element 203 is disposed in correspondence to one corresponding aperture region AP. Looking at the entire liquid crystal panel 120R, plural microlens elements 203 are disposed on a plane in correspondence to the plural aperture regions AP to configure a microlens array that is a refracting optical system.

An opposition substrate 206 that includes a transparent electrode 207 comprising an ITO film is formed at the inner side (emission side) of the microlens element 203. Also, the black matrix 205, which is a light-blocking portion, is formed between the opposition substrate 206 and the transparent electrode 207. The rectangular aperture region AP corresponding to a pixel as described above, is disposed in the black matrix 205. Moreover, an orientation film 208, to which predetermined orientation processing such as rubbing processing has been administered, is disposed at the emission side of the transparent electrode 207. The orientation film 208 includes a transparent organic film, such as a polyimide film.

Also, a TFT substrate 212 is formed at the inner side (incident side) of an emission-side dustproof transparent plate 213. A transparent electrode and a TFT (thin film transistor) forming layer 211 are disposed at the inner side of the TFT substrate 212. An orientation film 210 is disposed at a more inner side (incident side) of the TFT forming layer 211. The orientation film 208 and the orientation film 210 are disposed so that their rubbing directions are substantially orthogonal. Additionally, the opposition substrate 206 and the TFT substrate 212 are made to face each other, and the incident-side dustproof transparent plate 201 and the emission-side dustproof transparent plate 213 are adhered together. A liquid crystal layer 209 for image display is sealed between the opposition substrate 206 and the TFT substrate 212.

In the configuration shown in FIG. 1, the first polarizing plate 121R and the second polarizing plate 122R are disposed separately with respect to the liquid crystal panel 120R. However, instead of this, a polarizing plate can be disposed between the emission-side dustproof transparent plate 201 and the opposition substrate 206, and between the emission-side dustproof transparent plate 213 and the TFT substrate 212.

Next, the configuration and the action of the microlens element 203 will be described on the basis of FIG. 3. The microlens element 203, which is the lens portion, is configured by the optically transparent microlens array substrate 202 and the optically transparent adhesive layer 204. The incident light, which includes substantially parallel light beams, is refracted at the interface between the microlens array substrate 202 and the adhesive layer 204. Here, the configuration of the microlens element 203 will be described on the basis of FIG. 4. FIG. 4 is a schematic showing a configuration where one microlens element 203 corresponding to one aperture region AP is seen from an optical axis AX direction. The microlens element 203 is configured from aspherical sub-lenses ASP1, ASP2, ASP3 and ASP4 divided into quarters with respect to the square-shaped aperture region AP. The aspherical sub-lenses ASP1, ASP2, ASP3 and ASP4 include plural (in the present exemplary embodiment, four) vertex curvature radiuses V1, V2, V3 and V4. Additionally, annular portions are formed around the four vertex curvature radiuses V1, V2, V3 and V4. In this case, the four aspherical sub-lenses ASP1, ASP2, ASP3 and ASP4 are designed to control the focal positions in each annular portion. In this manner, a design where the annular portions are optimized for each aspherical sub-lens region is effected. Moreover, when the four aspherical sub-lenses ASP1, ASP2, ASP3 and ASP4 are arranged as shown in FIG. 4, a composite annular portion is formed around the optical axis AX. In the present exemplary embodiment, the composite annular portion will below be simply called a substantially annular portion or an annular portion. Also, a later-described concave lens R0 is formed in the vicinity of the optical axis AX.

Figure 3:
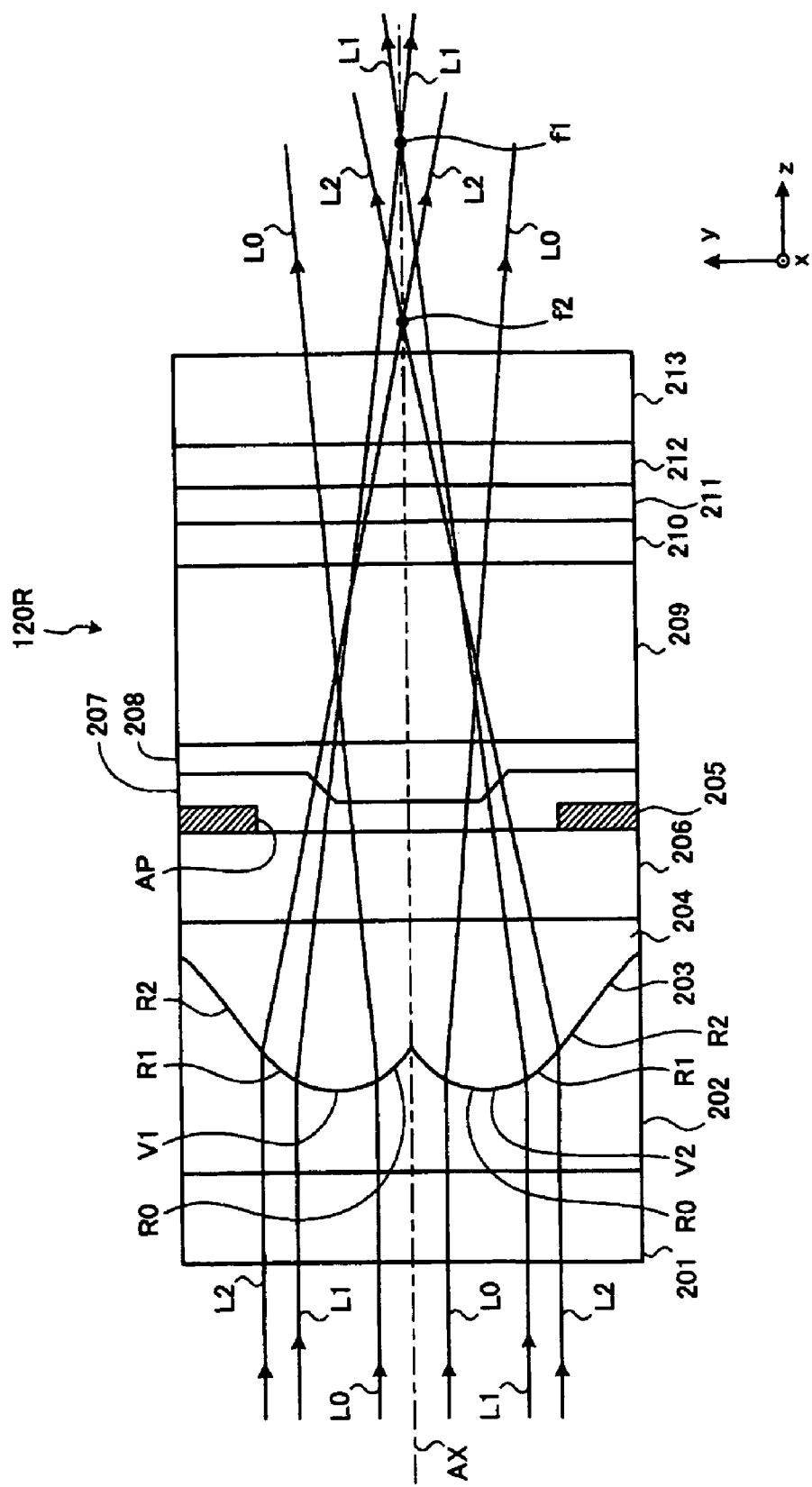
FIG. 3 is a schematic cross-sectional view of the liquid crystal panel of the first exemplary embodiment.
Figure 4:
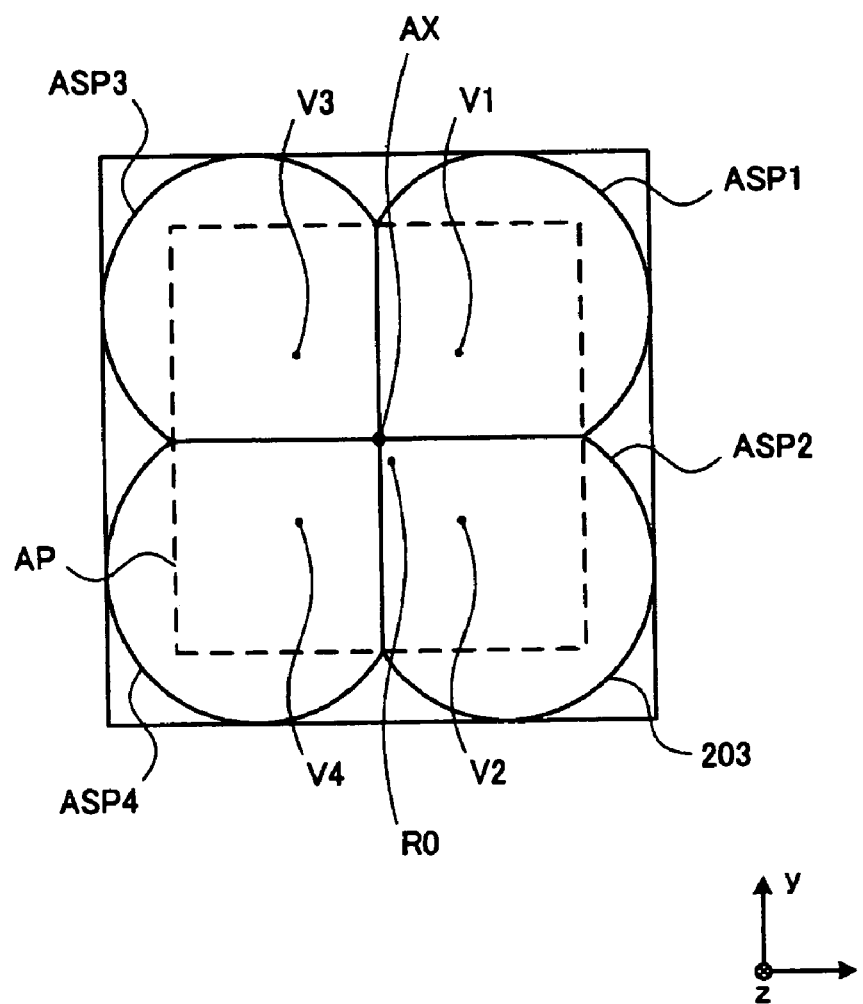
FIG. 4 is a schematic showing the front configuration of the liquid crystal panel of the first exemplary embodiment.

As shown in FIG. 3, the microlens element 203 in which the four aspherical sub-lenses ASP1, ASP2, ASP3 and ASP4 are made into a composite will be described. As mentioned above, the four aspherical sub-lenses are designed so that their respective annular portions include a focal position, as described later. Additionally, the microlens element 203 in which the four aspherical sub-lenses ASP1, ASP2, ASP3 and ASP4 are made into a composite, function as one aspherical lens including plural focal positions f1 and f2 that are different per plural substantially annular portions R1 and R2 around the optical axis AX. Additionally, light rays L1 in the vicinity of the optical axis AX made incident at the microlens element 203 are refracted by the annular portion R1, and condensed towards the focal position f1. Also, light rays L2 refracted by the other annular portion R2 further away from the optical axis AX than the annular portion R1 are condensed towards the focal position f2.

Moreover, the action of the microlens element 203 will be described. As mentioned above, the microlens element 203 condenses all of the light rays L1 and L2 so that they pass through the aperture region AP. Thus, the illumination light from the ultra-high pressure mercury lamp 101 can be efficiently passed through the aperture region AP, and the amount of light deflected by the aperture region AP can be reduced. As a result, the light can be used with high efficiency.

Also, the microlens element 203 includes the plural focal positions f1 and f2 that are different per the plural substantially annular portions R1 and R2 around the optical axis AX. Additionally, the focal position f2 of one annular portion R2 of the plural annular portions is at a position closer to the microlens element 203 than the focal position f1 of the annular portion R1 closer to the optical axis AX using one annular portion R2 as a reference. Moreover, both of the plural focal positions f1 and f2 are positioned closer to the emission side than the liquid crystal layer 209, which is a modulation portion. Due to this configuration, the microlens element 203 condenses the incident light to positions that are different per the plural substantially annular portions R1 and R2.

Thus, the distribution density of the light rays can be made substantially uniform in the vicinity of the liquid crystal layer 209. As a result, the local concentration of the light energy in the vicinity of the liquid crystal layer 209 can be reduced, whereby deterioration of the orientation films 208 and 210 can be reduced. Thus, a long-life liquid crystal panel 120R can be obtained.

Also, the lens shape of the center portion of the microlens element 203 in the vicinity of the optical axis AX is the concave lens R0 whose concave surface is oriented towards the incident side of the light. The concave lens R0 is a valley portion formed in the vicinity of the optical axis AX when the four aspherical sub-lenses ASP1, ASP2, ASP3 and ASP4, whose convex surfaces are oriented towards the incident side, are disposed. Additionally, the valley portion is a region that inevitably ends up being formed in part of the microlens element 203. The substantially parallel light rays L0 in the vicinity of the optical axis AX are converted to divergent light by the concave lens R0. Thus, the light rays L0 are not condensed in the vicinity of the liquid crystal layer 209. As described above, in the present exemplary embodiment, both of the plural focal positions f1 and f2 are positioned closer to the emission side than the liquid crystal layer 209, which is the modulation portion. With respect thereto, because the concave lens R0 is a lens including a negative refractive power, the focal position thereof is present closer to the incident side than the liquid crystal layer 209. The concave lens R0 that is the valley portion is nothing more than a portion of the entire microlens element 203, and is not a main component. For this reason, even if the focal position of the concave lens R0 is positioned closer to the incident side than the liquid crystal layer 209, this is within the spirit and scope of exemplary embodiments of the present invention. Moreover, as described above, the light rays L0 refracted by the concave lens R0 are diverged without being condensed in the vicinity of the liquid crystal layer 209. For this reason, the concave lens R0 also fulfills the function of reducing the energy concentration in the vicinity of the liquid crystal layer 209.

Also, in the present exemplary embodiment, because the local concentration of light energy in the vicinity of the liquid crystal layer 209 can be reduced, it becomes unnecessary to add, to the orientation films 208 and 210, an additive agent for enhancing light resistance. For this reason, a liquid crystal panel 120R whose manufacturing cost is inexpensive can be obtained. Moreover, both of the plural focal positions f1 and f2 are positioned closer to the emission side than the liquid crystal layer 209. Thus, the components made substantially perpendicularly incident with respect to the liquid crystal layer 209, i.e., the components parallel to the optical axis AX, become greater. As a result, a high-contrast image can be obtained.

Figure 5:
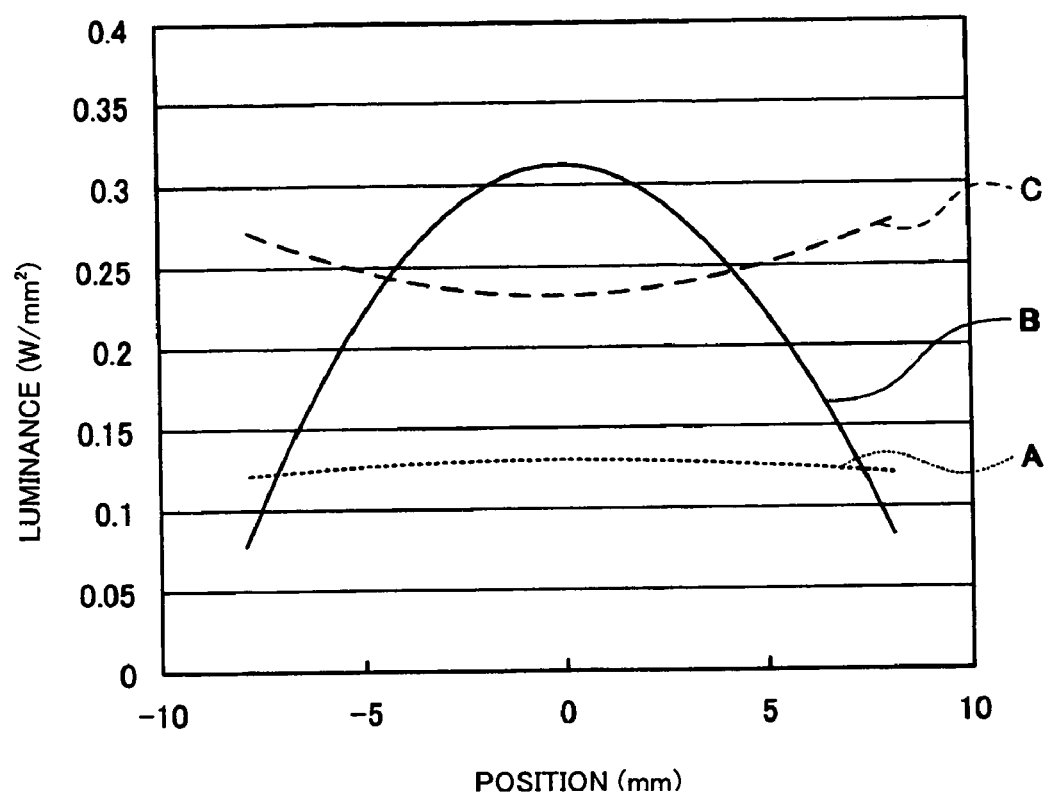
FIG. 5 is a schematic showing the luminance distributions inside aperture regions.

Next, examples of numerical values of the contrast and uniformity of the light beam density in the present exemplary embodiment will be described. FIG. 5 shows the luminance distribution of the aperture region AP. The horizontal axis of FIG. 5 represents optional positions in a cross-section perpendicular to the optical axis AX in the aperture region AP, and the vertical axis represents the luminance. Curve A represents the luminance distribution when a microlens element is not disposed. Curve B represents the luminance distribution when a related art aspherical microlens element is disposed. Curve C represents the luminance distribution when the microlens element 203 of the present exemplary embodiment is disposed.

When no microlens element is disposed, the illumination light cannot be effectively guided to the aperture region AP. For this reason, as is apparent from curve A, the overall luminance distribution is at a low level. The standard deviation of the light amount distribution in this case is 0.038108.

Also, when the related art aspherical microlens element is disposed, as is apparent from curve B, the light is effectively condensed towards the aperture region AP, whereby the peak level of the luminance distribution and the integral value thereof (=total light amount) become large. However, the light amount is concentrated in the center portion of the aperture region AP, and the light amount drops at the peripheral portions. The standard deviation of the light amount distribution in this case is 0.117735. For this reason, local energy concentrations arise in the orientation films. As a result, the orientation films end up deteriorating.

In contrast, when the microlens element 203 of the present exemplary embodiment is disposed, as represented by curve C, the luminance level of the luminance distribution is substantially uniform across the entire aperture region. The standard deviation of the light amount distribution in this case is 0.081955. Moreover, the luminance level also becomes larger in comparison to curve A. For this reason, it will be understood that in the present exemplary embodiment, there is no local energy concentration, and the light is used effectively and has a substantially uniform luminance distribution. In the present exemplary embodiment, because the light has a substantially uniform luminance distribution, in relation to the light resistance of the liquid crystal panel, it is possible to increase the lifespan by about 4.6 times in comparison to related art technology. In the present exemplary embodiment, one microlens element 203 is configured from the aspherical sub-lenses ASP1, ASP2, ASP3 and ASP4 divided into quarters. However, the microlens element is not limited to this and may be configured by five or more aspherical sub-lenses.

Second Exemplary Embodiment

Figure 6:
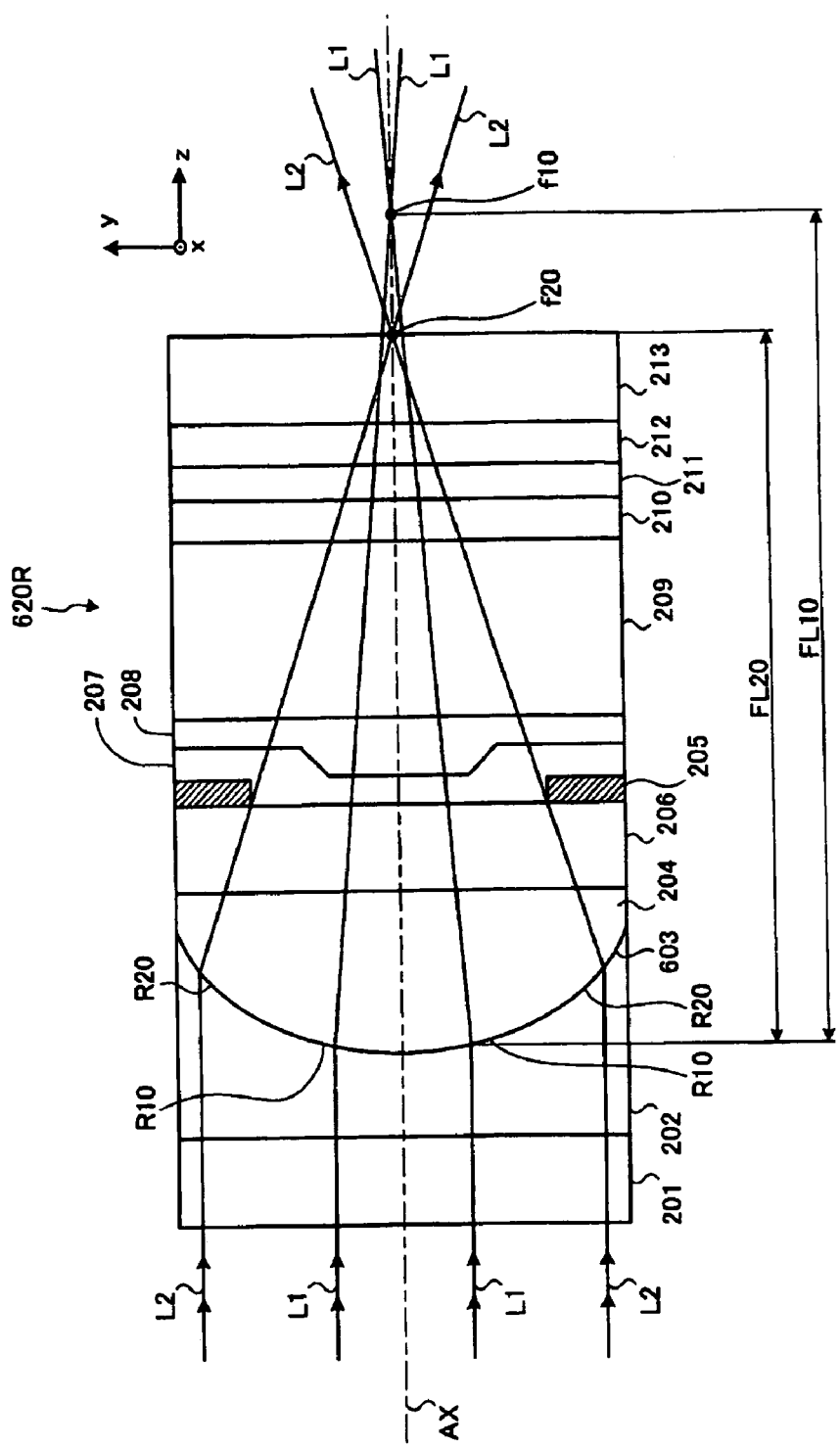
FIG. 6 is a schematic showing a cross-sectional view of a liquid crystal panel of a second exemplary embodiment.

FIG. 6 is a schematic perspective cross-sectional view of the configuration of part of a liquid crystal panel 620R of a projector pertaining to a second exemplary embodiment. In the liquid crystal panel 620R, plural aperture regions AP are disposed in substantially orthogonal grids. The aperture regions AP, which are pixel aperture portions, are rectangular aperture portions formed in a black matrix 205 that includes a light-blocking function. The aperture region AP corresponds to one pixel. FIG. 6 shows only one aperture region AP of the plural aperture regions AP of the liquid crystal panel 620R. Because the configuration of the liquid crystal panel 620R corresponding to the other aperture regions is the same as the configuration shown in FIG. 6, overlapping description will be omitted. Also, the same reference numerals will be given to portions that are the same as those of the preceding first exemplary embodiment, and overlapping description will be omitted.

A microlens element 603 of the present exemplary embodiment has a rotationally symmetrical shape around the optical axis AX. The microlens element 603 includes plural focal positions f10 and f20 that are different per plural substantially annular portions R10 and R20 around the optical axis AX. Additionally, the focal position f20 of one annular portion R20 of the plural annular portions R10 and R20 is at a position closer to the microlens element 603 than the focal position f10 of the annular portion R10 closer to the optical axis AX using the one annular portion R20 as a reference. Moreover, both of the plural focal positions f10 and f20 are positioned closer to the emission side than the liquid crystal layer 209, which is the modulation portion.

FIG. 7 is a schematic showing a configuration where one microlens element 603 corresponding to one aperture region AP is seen from the optical axis AX direction. The microlens element 603 has a rotationally symmetrical shape around the optical axis AX. Additionally, the microlens element 603 includes, in order from the side close to the optical axis AX, the annular portion R10, an annular portion R15 and the annular portion R20.

Returning to FIG. 6, the light rays L1 close to the optical axis AX are refracted by the annular portion R10 and condensed towards the focal position f10. The light rays L2 far from the optical axis AX are refracted by the annular portion R20 and condensed towards the focal position f10. The focal position f20 is at a position closer to the microlens element 603 than the focal position f10. Thus, the distribution density of the light rays can be made substantially uniform in the vicinity of the liquid crystal layer 209. As a result, the local concentration of the light energy in the vicinity of the liquid crystal layer 209 can be reduced, whereby deterioration of the orientation films 208 and 210 can be reduced. Thus, a long-life liquid crystal panel 620 R can be obtained.

Moreover, both of the plural focal positions f10 and f20 are positioned closer to the emission side than the liquid crystal layer 209. Thus, the components made substantially perpendicularly incident with respect to the liquid crystal layer 209, i.e., the components parallel to the optical axis AX, become greater. As a result, a high-contrast image can be obtained.

Also, the microlens element 603 condenses the light made incident so that it passes through the aperture region AP. Thus, the illumination light from the ultra-high pressure mercury lamp 101 can be efficiently passed through the aperture region AP, and the amount of light deflected by the aperture region AP can be reduced. Thus, the light can be used with high efficiency.

In the present exemplary embodiment, it is preferable for the ratio where the focal depth FL10 of the annular portion R10 closest to the optical axis AX is divided by the focal depth FL20 of the annular portion R20 furthest away from the optical axis AX to be greater than 1.1. FIG. 6 shows a state where, with respect to each focal depth, the rear-side main point of the microlens element 603 and the near axis curvature vertex of the lens surface substantially match. Thus, the distribution density of the light rays can be made more substantially uniform in the vicinity of the liquid crystal layer 209. Also, the components made substantially perpendicularly incident with respect to the liquid crystal layer 209, i.e., the components parallel to the optical axis AX, become greater. As a result, a high-contrast image can be obtained.

Also, it is preferable for the ratio where the focal depth FL10 of the annular portion R10 closest to the optical axis AX is divided by the focal depth FL20 of the annular portion R20 furthest away from the optical axis AX to be greater than 1.2. It is even more preferable for the ratio where the focal depth FL10 of the annular portion R10 closest to the optical axis AX is divided by the focal depth FL20 of the annular portion R20 furthest away from the optical axis AX to be greater than 1.3. Thus, the distribution density of the light rays can be made more substantially uniform in the vicinity of the liquid crystal layer 209. Additionally, an even higher contrast image can be obtained.

The microlens element 603 of the present exemplary embodiment is configured by the three annular portions R10, R15 and R20. However, the microlens element is not limited to this and may be configured from four or more annular portions.

(Manufacturing Methods)

Figures 1, 8:
Figures 2, 8:
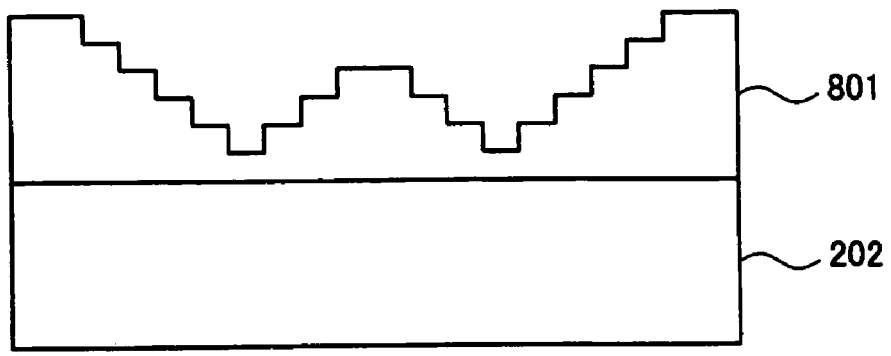
Figures 3, 8:
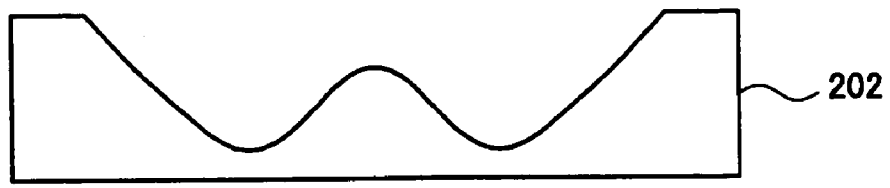
Figures 4, 8:
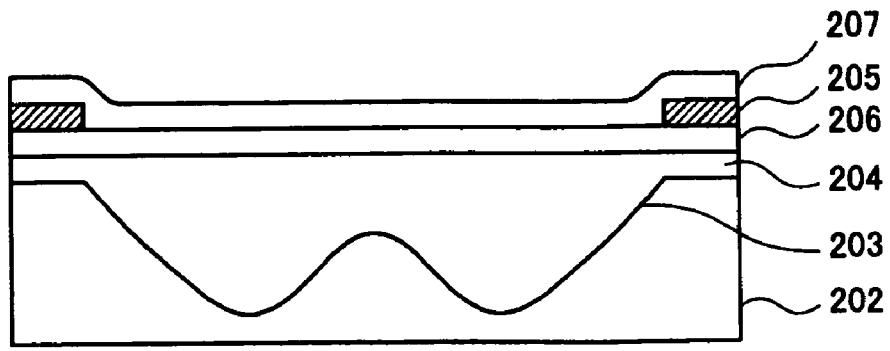

Next, three different methods of manufacturing the microlens elements pertaining to the preceding exemplary embodiments will be described. The first manufacturing method uses grayscale lithography. As an example, a case will be described where the microlens element 203 including the four aspherical sub-lenses ASP1, ASP2, ASP3 and ASP4 described in the first exemplary embodiment is manufactured. FIG. 8-1 shows an example of the gray level of a grayscale mask 800. The grayscale mask 800 is a mask including a grayscale pattern corresponding to tones using photosensitive glass and an area tone mask.

As shown in FIG. 8-2, a resist layer 801 is laminated, by spin coating or spray coating, on the microlens array substrate 202, which includes a glass substrate or a synthetic quartz substrate. Then, using the grayscale mask 800, a desired microlens element shape pattern is formed in the resist film by photolithography. Thereafter, dry etching is conducted using fluorine gas such as $C_4F_8$. Thus, as shown in FIG. 8-3, a shape pattern is formed in the microlens array substrate 202. Next, as shown in FIG. 8-4, the microlens array substrate 202 and the opposition substrate 206 are fixed together via the optically transparent adhesive layer 204. A material that causes a predetermined refractive index difference between the microlens array substrate 202 and the opposition substrate 206 is used. Thereafter, the black matrix 205 and the transparent electrode 207 including ITO are sequentially formed by a related art procedure. Thus, the liquid crystal panel 120R including a microlens array comprising plural microlens elements 203 can be manufactured.

Figures 1, 9:
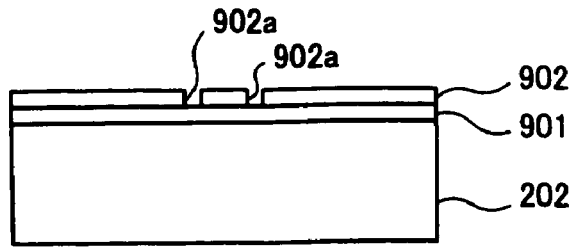
Figures 2, 9:
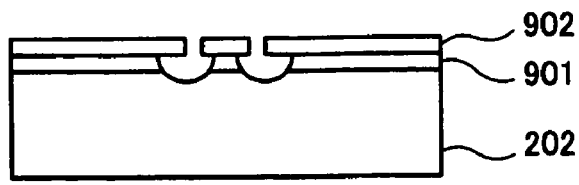
Figures 3, 9:
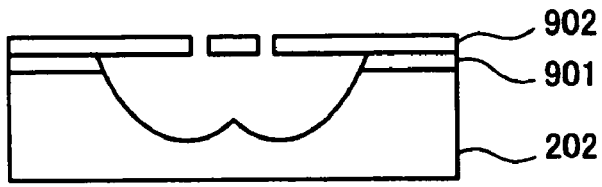
Figures 4, 9:
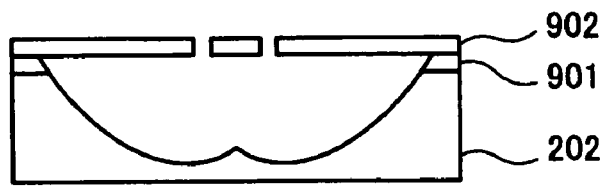
Figures 5, 9:
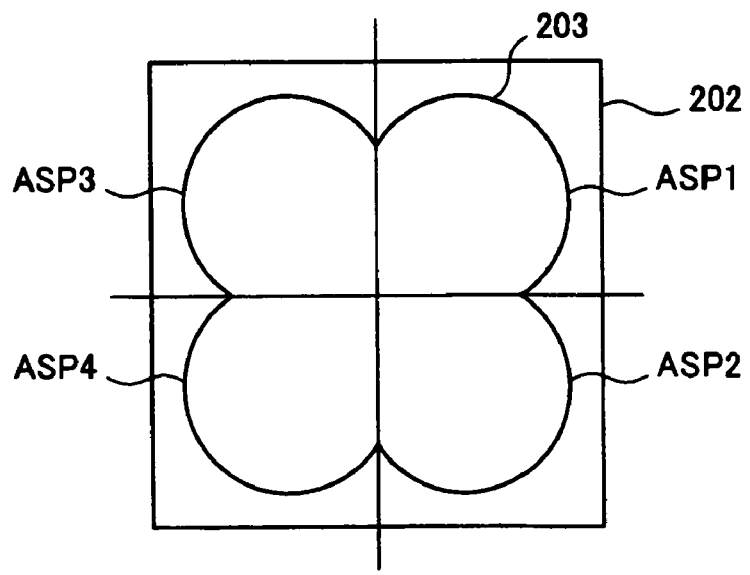

Next, the second manufacturing method will be described. As an example, a case will be described where the microlens element 203 including the four aspherical sub-lenses ASP1, ASP2, ASP3 and ASP4 described in the first exemplary embodiment is manufactured. As shown in FIG. 9-1, an HTO film 901 is formed on the microlens array substrate 202, which includes a glass substrate. The HTO film 901 is configured by a material whose etching rate is faster than that of glass. A Cr mask 902 is formed on the HTO film 901. Four aperture portions 902a are patterned in the Cr mask 902 in a photolithographic process in correspondence to the positions of the vertex curvature radiuses V1, V2, V3 and V4 shown in FIG. 4. Then, as shown in FIG. 9-2, the etching proceeds around the aperture portions 902a when wet etching is conducted with a fluorine solution. At this time, the rate at which the etching proceeds in the HTO film 901 is faster than that in the microlens array substrate 202. When etching further proceeds, the etching regions corresponding to adjacent aperture regions 902a overlap as shown in FIGS. 9-3 and 9-4. Then, as shown in the front view of FIG. 9-5, the four aspherical sub-lenses ASP1, ASP2, ASP3 and ASP4 can be formed. Thereafter, the black matrix 205 and the transparent electrode 207 including ITO are sequentially formed by a related art procedure. Thus, the liquid crystal panel 120R including a microlens array including plural microlens elements 203 can be manufactured.

Figures 1, 10:
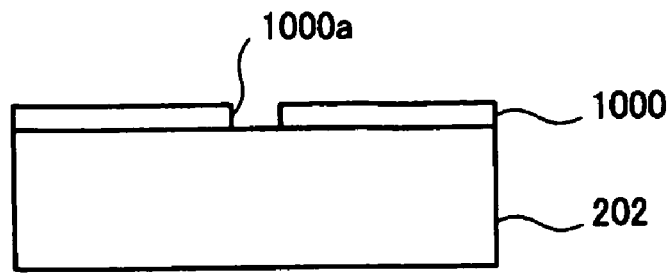
Figures 2, 10:
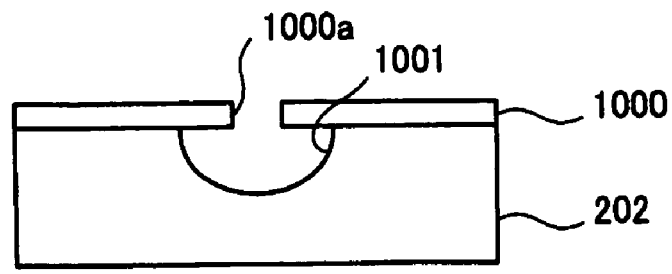
Figures 3, 10:
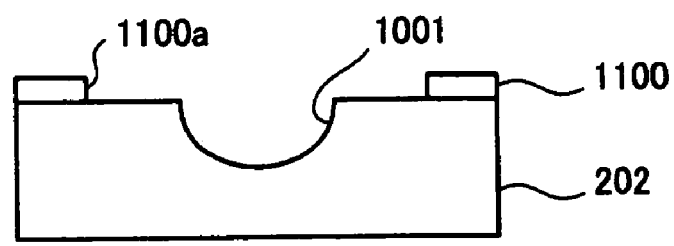
Figures 4, 10:
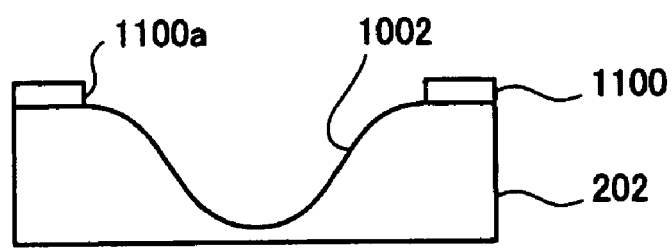
Figures 5, 10:
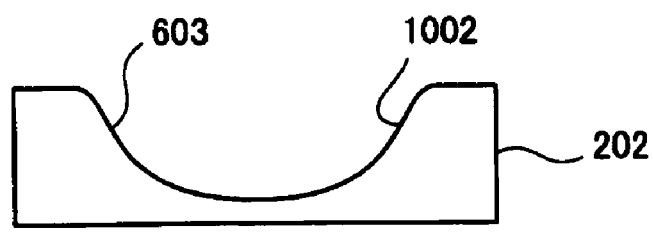

Next, the third manufacturing method will be described. As an example, a case will be described where the microlens element 603 described in the second exemplary embodiment is manufactured. As shown in FIG. 10-1, a first Cr mask 1000 is formed on the microlens array substrate 202, which includes a glass substrate. A first aperture portion 1000a is patterned in the first Cr mask 1000 in a photolithographic process. Then, as shown in FIG. 10-2, etching proceeds around the first aperture portion 1000a when wet etching is conducted with a fluorine solution. As a result, a spherical first lens shape 1001 is formed. Next, the first Cr mask 1000 is separated from the microlens array substrate 202. Then, a second Cr mask 1100 is formed. Here, an unillustrated resist layer is formed by spray coating. As shown in FIG. 10-3, patterning is conducted, and a second aperture portion 1000a that is larger than the first aperture portion 1000a is formed. Wet etching is again conducted with a fluorine solution. As a result, a second lens shape 1002, which has an aspherical surface as shown in FIG. 10-4, is formed. Then, as shown in FIG. 10-5, the second Cr mask 1100 is separated. Thereafter, the black matrix 205 and the transparent electrode 207 including ITO are sequentially formed by a related art procedure. Thus, the liquid crystal panel 620R including a microlens array comprising plural microlens elements 603 can be manufactured.

INDUSTRIAL APPLICABILITY

As described above, the spatial light modulator pertaining to exemplary embodiments of the present invention is useful in a liquid crystal type spatial light modulator.

What is claimed is:
1. A spatial light modulator, comprising:
   a modulation portion that includes plural pixel aperture portions, modulates light in accordance with image signals and emits the modulated light; and
   lens portions that are disposed at an incident side of the modulation portion in correspondence to the pixel aperture portions and condense the light made incident so that the light passes through the pixel aperture regions,
   the lens portions including plural focal positions that are different per plural substantially annular portions around an optical axis;
   a focal position of one annular portion of the plural annular portions being at a position closer to the lens portions than a focal position of the annular portion closer to the optical axis using the one annular portion as a reference; and
   both of the plural focal positions being positioned closer to an emission side than the modulation portion.
2. The spatial light modulator of claim 1, the lens portions being aspherical lenses including plural vertex curvature radii.
3. The spatial light modulator of claim 1, a ratio where a focal depth of the substantially annular portion closest to the optical axis is divided by a focal depth of the substantially annular portion furthest away from the optical axis being greater than 1.1.
4. The spatial light modulator of claim 1, the standard deviation of the light amount, in regions of the pixel aperture portions, of the light passing through the pixel aperture portions due to the lens portions being less than 0.1.
5. A projector, comprising:
   a light source that supplies light;
   the spatial light modulator of claim 1; and
   a projection lens that projects the light from the spatial light modulator.

* * * * *